(12) United States Patent
Fukumoto et al.

(10) Patent No.: US 9,624,957 B2
(45) Date of Patent: Apr. 18, 2017

(54) CLIP FOR FIXING TWO MEMBERS

(71) Applicant: NIFCO INC., Yokosuka-shi, Kanagawa (JP)

(72) Inventors: Mitsuru Fukumoto, Yokosuka (JP); Takeru Fukuda, Wako (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 194 days.

(21) Appl. No.: 14/412,907

(22) PCT Filed: Jul. 3, 2013

(86) PCT No.: PCT/JP2013/004131
§ 371 (c)(1),
(2) Date: Jan. 5, 2015

(87) PCT Pub. No.: WO2014/006894
PCT Pub. Date: Jan. 9, 2014

(65) Prior Publication Data
US 2015/0159687 A1 Jun. 11, 2015

(30) Foreign Application Priority Data
Jul. 6, 2012 (JP) .................. 2012-152609

(51) Int. Cl.
*F16B 19/10* (2006.01)
*F16B 21/06* (2006.01)
*F16B 21/08* (2006.01)

(52) U.S. Cl.
CPC ........ *F16B 19/1081* (2013.01); *F16B 21/065* (2013.01); *F16B 21/086* (2013.01)

(58) Field of Classification Search
CPC .. F16B 21/065; F16B 21/075; F16B 19/1081; F16B 19/1072
(Continued)

(56) References Cited

U.S. PATENT DOCUMENTS 4,331,413 A * 5/1982 Hoen ............ F16B 21/02
411/44
4,952,106 A * 8/1990 Kubogochi ........ F16B 19/1081
411/48
(Continued)

FOREIGN PATENT DOCUMENTS

JP     S54-027649 A    3/1979
JP     H05-019074 U    3/1993
(Continued)

OTHER PUBLICATIONS

PCT, "International Search Report for PCT/JP2013/004131".

*Primary Examiner* — Flemming Saether
(74) *Attorney, Agent, or Firm* — Manabu Kanesaka

(57) ABSTRACT

A clip includes a clip body, and a pin inserted into the clip body. The clip body includes a main body head portion having a through-hole for inserting the pin, a leg portion extending from the head, and an elastic engaging piece elastically deformable, and projecting outward from the leg portion. The pin includes a pin head portion provided with a tool-engaging portion engaging a tool for a rotational operation, and a pin shaft portion having small and large diameter portions. The main body head portion includes an inclined surface inclined from one end side toward another end side in an axial direction of the through-hole. The pin includes a guide portion slidingly contacting with the inclined surface. When the pin rotates inside the clip main body, the pin advances and retracts between a first position allowing an inward elastic deformation and a second position controlling an inward elastic deformation.

8 Claims, 8 Drawing Sheets

(58) Field of Classification Search
USPC .................................................. 411/45–48
See application file for complete search history.

(56) References Cited

U.S. PATENT DOCUMENTS

| | | | |
|---|---|---|---|
| 6,514,023 B2* | 2/2003 | Moerke | F16B 19/1081 411/41 |
| 6,540,461 B1* | 4/2003 | Hawang | F16B 21/02 411/41 |
| 6,827,536 B1 | 12/2004 | Leon et al. | |
| 6,955,514 B2* | 10/2005 | Hoshi | F16B 5/065 24/297 |
| 7,052,221 B2* | 5/2006 | Bentrim | F16B 5/0642 24/458 |
| 7,188,393 B2* | 3/2007 | Kawai | B60R 13/0206 24/297 |
| 7,374,200 B2* | 5/2008 | Ikeda | B60R 21/213 280/728.2 |
| 2002/0094253 A1 | 7/2002 | Enomoto et al. | |
| 2009/0263210 A1* | 10/2009 | Loewe | F16B 19/1081 411/553 |

FOREIGN PATENT DOCUMENTS

| | | |
|---|---|---|
| JP | H05-26332 U | 4/1993 |
| JP | H07-233807 A | 9/1995 |

* cited by examiner

CLIP FOR FIXING TWO MEMBERS

RELATED APPLICATIONS

The present application is National Phase of International Application No. PCT/JP2013/004131 filed Jul. 3, 2013, and claims priority from Japanese Application No. 2012-152609, filed Jul. 6, 2012, the disclosure of which is hereby incorporated by reference herein in its entirety.

FIELD OF TECHNOLOGY

The present invention relates to a clip mutually fixing both members by a fixing operation using a tool such as a driver and the like.

Background Art

Conventionally, as for this type of clip, there is known a clip comprising a cylindrical clip main body inserted into one plate-like member; and a screw member inserted into the clip main body in a state of holding the other plate-like member, and an insertion of the screw member allows a tip portion of the clip main body to spread so as to mutually fix both members (see Patent Document 1). In the conventional clip, a hollow spacer portion is provided in the clip main body, and inside the spacer portion, there is formed a detachment-prevention piece spreading by the insertion of the screw member, in which a screw thread is formed at a contact portion with the screw member thereof, and the screw thread of the detachment-prevention piece and a screw thread of the screw member are engaged with each other. According to the conventional clip, both members can be reliably fixed, and a user can release a fixation of both members by rotating the screw member in a predetermined direction while fixing both members by pushing the screw member in an insertion direction using the driver.

Prior Art Document

PATENT DOCUMENT

Patent Document 1: Japanese Utility Model Publication No. H05-26332

SUMMARY OF THE INVENTION

Problems to be Solved by the Invention

In the conventional technology described in the aforementioned Patent Document 1, however, when both members are fixed, there is a problem for a user that it requires a troublesome work such that after the clip main body is passed through an attachment hole formed in one plate-like member, the screw member is pushed into the clip main body while positioning an attachment hole formed in the other plate-like member. In that case, in order to reduce a work burden, it can also be considered that the screw member is kept in a temporarily connected state relative to the clip main body (i.e., only a tip portion of the screw member is inserted into the clip main body); however, in the temporarily connected state, a head portion side of the screw member largely projects from the clip main body so as to become remarkably unstable.

Also, in the aforementioned conventional technology, there is also a problem that it is difficult for a user to clearly determine a fixed or fixation-released state of both members by the clip.

The present invention is invented in view of the problems of such conventional technology, and a main object of the present invention is to provide a clip that a user can fix both members by a simple operation, and can easily confirm the fixed or fixation-released state of both members.

Means for Solving the Problems

A clip according to the first aspect of the present invention is a clip (1) comprising a clip main body (2) mutually fixing first and second members (P1 and P2); and a pin (3) inserted into the clip main body to be rotatable and capable of advancing and retracting. The clip main body includes a main body head portion (12) having a through-hole (11) into which the pin is inserted; a leg portion (13) extending from the main body head portion, and inserted into attachment holes (P1a and P2a) of the first and second members; and an elastic engaging piece (14) provided to be elastically deformable in a direction of intersecting in an insertion direction of the pin, projecting outward from the leg portion, and engaging the attachment hole of the second member. The pin includes a pin head portion (51) provided with a tool-engaging portion (51a) engaging a tool (D) carrying out a rotational operation thereof; and a pin shaft portion (52) provided with a small diameter portion (56) and a large diameter portion (55). In the main body head portion, there is formed an inclined surface (21) extending along an inner peripheral edge portion of the through-hole, and inclined from one end side toward the other end side in an axial direction of the through-hole. The pin includes a guide portion (53) slidingly contacting with the inclined surface, and in a state wherein the guide portion slidingly contacts with the inclined surface, the pin rotates inside the clip main body so as to advance and retract between a first position allowing an inward elastic deformation thereof by facing the small diameter portion with the elastic engaging piece; and a second position controlling the inward elastic deformation thereof by facing the large diameter portion with the elastic engaging piece.

In the clip according to the first aspect, a user can fix or fix-release both members by moving the pin by a guide of the inclined surface by a simple operation, and can easily confirm a fixed or fix-released state of both members by a position of the pin.

In a second aspect of the present invention, the pin moves from an advanced position which is the first position to a retracted position which is the second position, so that the first and second members come to a mutually fixed state.

In the clip according to the second aspect, with respect to the first aspect, a user can fix both members by the simple operation for retracting the pin up to the retracted position while rotating the tool after the tool is attached to the pin head portion (a tool engaging portion) in a state wherein the pin is temporarily connected relative to the clip main body in the advanced position, and the leg portion is inserted into the attachment holes of both members to be kept in a temporarily fixed state. Also, the pin moves between the advanced position and the retracted position when both members are fixed or fix-released, so that a user can easily confirm the fixed or fix-released state of both members.

In a third aspect of the present invention, with respect to the first or second aspect, in the main body head portion, there is provided a rotation-control concave portion (22) disposed on one end side of the inclined surface, into which the guide portion is inserted in a case wherein the pin is located in the second position.

The clip according the third aspect holds the pin in the second position by inserting the guide portion (53) into the rotation-control concave portion so as to stably hold the fixed state of both members.

In a fourth aspect of the present invention, with respect to any of the first to third aspects, there is further provided a lid body (4) attached to an insertion side of the pin in the clip main body, and in the lid body, there is provided an urging piece (46) urging the pin in an insertion direction of the guide portion relative to the rotation-control concave portion in the case wherein the pin is located in the second position.

The clip according to the fourth aspect prevents the guide portion from coming out of the rotation-control concave portion by an urging force of the urging piece so as to more reliably hold the pin in the second position.

In a fifth aspect of the present invention, with respect to any of the first to fourth aspects, in the main body head portion, there is provided a rotation-control convex portion (24) positioned on the other end side of the inclined surface, and abutting against the pin which is located in the first position so as to control a rotation of the pin into the second position side.

The clip according to the fifth aspect holds the pin in the first position by the rotation-control convex portion so as to stably hold a temporality connected state of the pin (a fix-released state of the clip) relative to the clip main body.

In a sixth aspect of the present invention, with respect to any of the first to fifth aspects, in the main body head portion, there is provided a rotation control wall (28) projecting inward from an inner peripheral face of the through-hole at least at one end portion of the inclined surface, and controlling a movement of the guide portion.

The clip according to the sixth aspect can appropriately restrict a rotation range of the pin and a torque by the rotation control wall, so that a transition completion from the first position to the second position of the pin can be reliably confirmed.

In a seventh aspect of the present invention, with respect to the sixth aspect, the rotation control wall abuts against the guide portion respectively in the first position and the second position of the pin, and controls a further movement of the pin which is located in the second position while controlling a further movement of the pin which is located in the first position.

The clip according to the seventh aspect can appropriately restrict the rotation range of the pin and the torque by a simple structure, and a stable rotation movement of the pin can be carried out between the first position and the second position.

In an eighth aspect of the present invention, with respect to the seventh aspect, in the main body head portion, there is provided an escape-control projecting portion (25) positioned on the other end side of the inclined surface, and projecting inward from the inner peripheral face of the through-hole in such a way as to abut against the pin which is located in the first position from an anti-insertion side thereof.

The clip according to the eighth aspect can reliably hold the pin in the first position (i.e., reliably hold the temporarily connected state of the pin relative to the clip main body) by the escape-control projecting portion even in a case wherein an external force acts in an anti-insertion direction thereof relative to the pin which is located in the first position.

Effect of the Invention

Thus, according to the present invention, an excellent effect is provided such that a user can fix both members by the simple operation, and can easily confirm the fixed or fix-released state of both members.

BEST MODES OF CARRYING OUT THE INVENTION

Hereinafter, embodiments of the present invention will be explained with reference to the drawings. In an explanation, terms indicating the directions follow the directions shown by arrows in FIG. 1 in the first embodiment. However, an arrangement of an actual use of a clip according to the present invention is not limited to the aforementioned directions.

Figure 1:
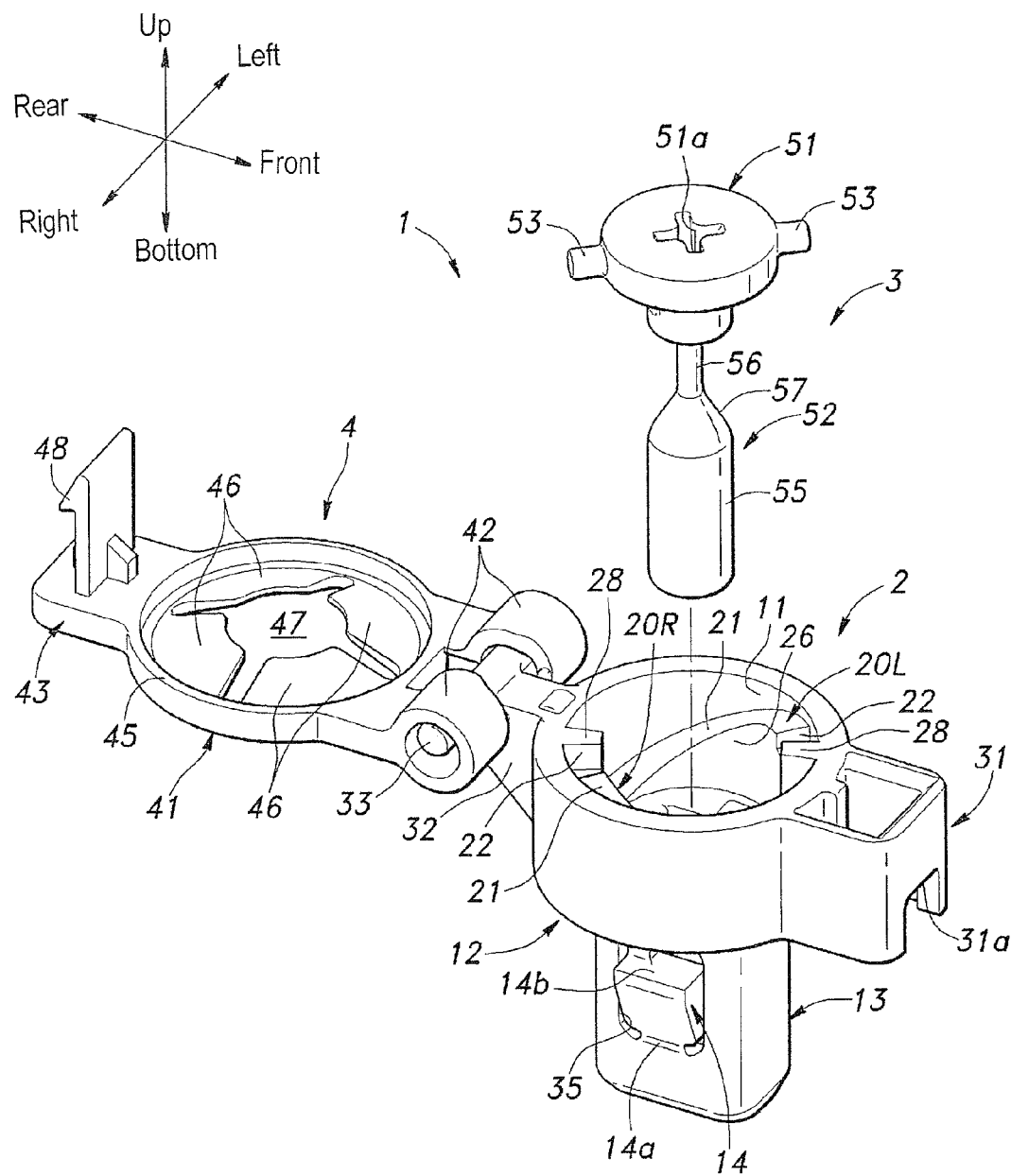
FIG. 1 is an exploded perspective view of a clip according to the present invention.

As shown in FIG. 1, the clip 1 is formed by a resin material, and comprises a clip main body 2 mutually fixing plate-like first and second members P1 and P2 (see FIG. 6); a pin 3 inserted into the clip main body 2 to be rotatable and capable of advancing and retracting; and a lid body 4 attached to an upper portion of the clip main body 2 (an insertion side of the pin 3).

The clip main body 2 includes a main body head portion 12 having an approximately cylindrical shape; a leg portion 13 extending downward from a lower end of the main body head portion 12, and having an approximately rectangular cylindrical shape; and a pair of elastic engaging pieces 14 disposed on right and left of the leg portion 13, and provided to be elastically deformable (displaceable). In the main body head portion 12 and the leg portion 13, there is formed a through-hole 11 into which the pin 3 is inserted.

Figure 4:
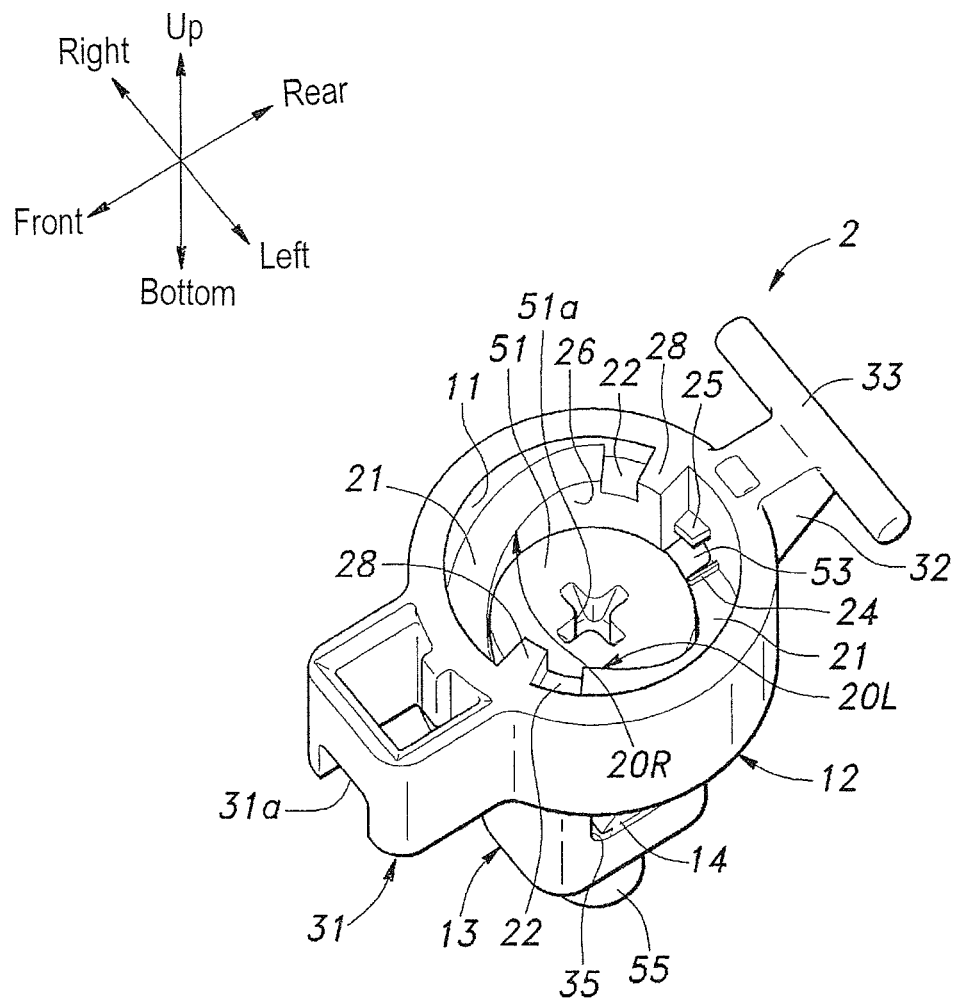
FIG. 4 is a perspective view of essential parts showing the temporarily connected state between the clip main body and the pin in a state wherein a lid body shown in FIG. 2 is removed.

Inside the main body head portion 12, as shown in FIG. 4 as well, there is formed a pair of step portions 20L and 20R respectively extending over an approximate semicircle along an inner peripheral edge portion of the through-hole 11. The step portions 20L and 20R have a symmetrical shape relative to a center axis of the through-hole 11, respectively. Approximately helical inclined surfaces 21 forming upper faces of the step portions 20L and 20R have a predetermined width on an inner side in a radial direction from an inner peripheral face of the through-hole 11, and gently incline from an upper side to a lower side of the main body head portion 12 respectively.

Figure 5:
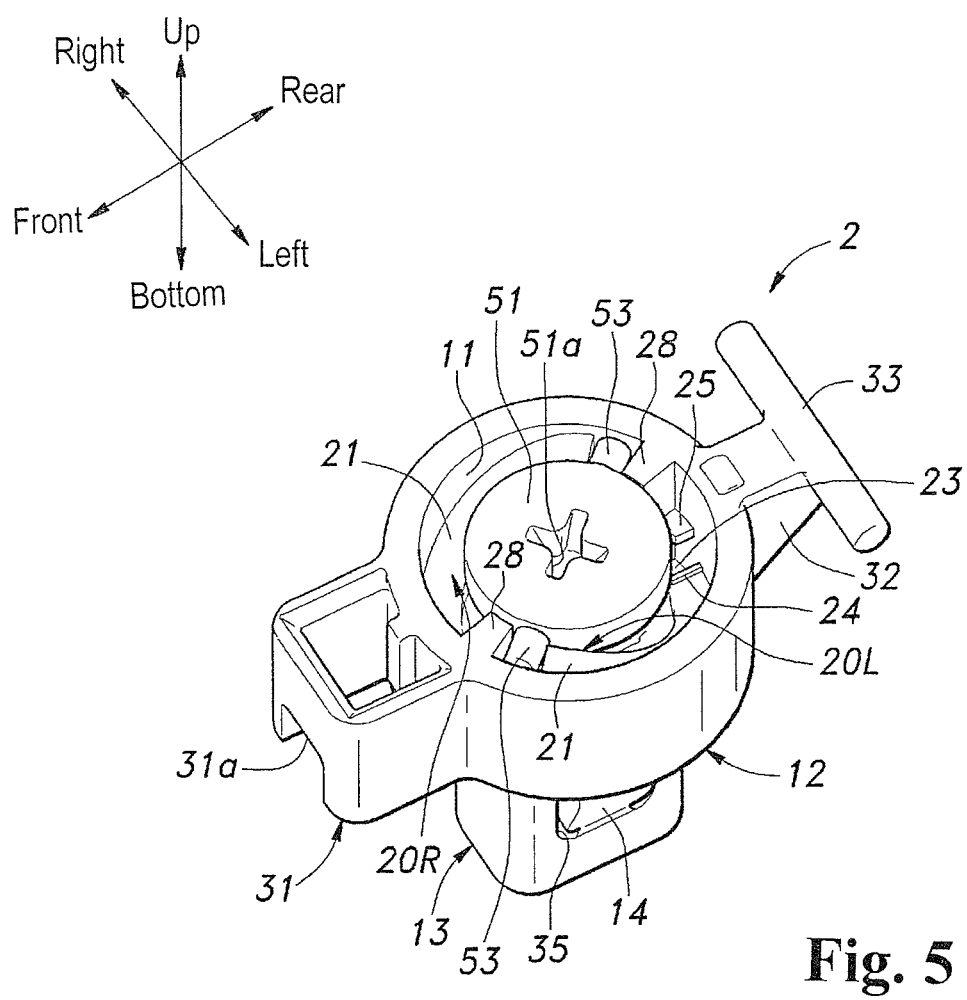
FIG. 5 is a perspective view of the essential parts showing the connected state between the clip main body and the pin in a state wherein the lid body shown in FIG. 3 is removed.

Also, on an upper end side of the inclined surface 21 in the step portions 20L and 20R, there is provided a concave portion (a rotation-control concave portion) 22, and the concave portion 22 continues to an upper end edge of the inclined surface 21, and has a shape concaved downward. Also, as shown in FIG. 5, on a lower end side of the inclined surface in the step portions 20L and 20R, there is provided a concave portion 23 (in FIG. 5, only the concave portion 23 on a step portion 20R side is shown), and at a lower end edge of the inclined surface 21 defining one portion of a peripheral edge of the concave portion 23 (more specifically, continuing to an upper end of a lateral face on an inclined surface 21 side of the concave portion 23), there is provided a convex portion (a rotation-control convex portion) 24 extending in a width direction of the inclined surface 21 (a radial direction of the main body head portion 12). Moreover, above the concave portion 23, there is provided a projecting piece (an escape-control projecting portion) 25 projecting from an inner peripheral face of the main body head portion 12 in such a way as to cover one portion thereof. Also, in the step portions 20L and 20R, an inner diameter of a lateral peripheral surface (see FIG. 1) continuing to an inner peripheral edge of the inclined surface 21 is set in a size approximately the same as an outer diameter of a pin head portion 51 (except for a guide portion 53) of the later-mentioned pin 3.

On an upper end side (a side opposing the inclined surface 21) of the concave portion 22 in the step portions 20L and 20R, there is provided a partition wall (a rotation control wall) 28 extending in an axial direction of the through-hole 11 up to an upper end of the main body head portion 12. One lateral face of the partition wall 28 forms a lateral face of the concave portion 22, and on the other hand, the other lateral face of the partition wall 28 defines one portion of the peripheral edge of the concave portion 23 (an edge portion on a side facing the lower end edge of the inclined surface 21 in the other step portion) provided on the lower end side of the inclined surface 21 in the other step portion. Namely, both step portions 20L and 20R are mutually connected respectively through the partition wall 28, and the inclined surface 21, the concave portion 22, and the concave portion 23 formed in the respective step portions 20L and 20R are divided by the partition wall 28.

Also, on a front side of the main body head portion 12, there is formed a locking portion 31 for connecting to the lid body 4 in such a way as to project forward from an outer peripheral wall thereof. The locking portion 31 has an approximately rectangular cylindrical shape extending in an up-and-down direction and having a through-hole, and at a lower end of a front wall thereof, there is formed a notch portion 31a forming an approximately rectangular shape. Also, on a back side of the main body head portion 12, there are provided a shaft support piece 32 projecting backward from a peripheral wall thereof; and a support shaft 33 extending in a right-and-left direction in which an intermediate portion is supported at a back end of the shaft support piece 32.

In a right side wall (a left side wall is also the same) of the leg portion 13, as shown in FIG. 1, there is formed an opening portion 35 where the elastic engaging piece 14 is disposed. In the elastic engaging piece 14, a base end portion 14a on a lower side thereof is connected to a lower edge of the opening portion 35, and by an elastic deformation of the base end portion 14a, a free end side (an upper side) can be displaced in a right-and-left direction (a direction of intersecting with an insertion direction of the pin 3). Also, the elastic engaging piece 14 widens in such a way as to gradually project outward from a lateral face of the leg portion 13 as moving upward from the base end portion 14a, and thereby, in a free end (an upper end) of the elastic engaging piece 14, there is formed an engaging claw 14b. Incidentally, a shape, an arrangement, a quantity, and the like of the elastic engaging piece 14 can be variously modified provided that they provide the same function.

Figure 2:
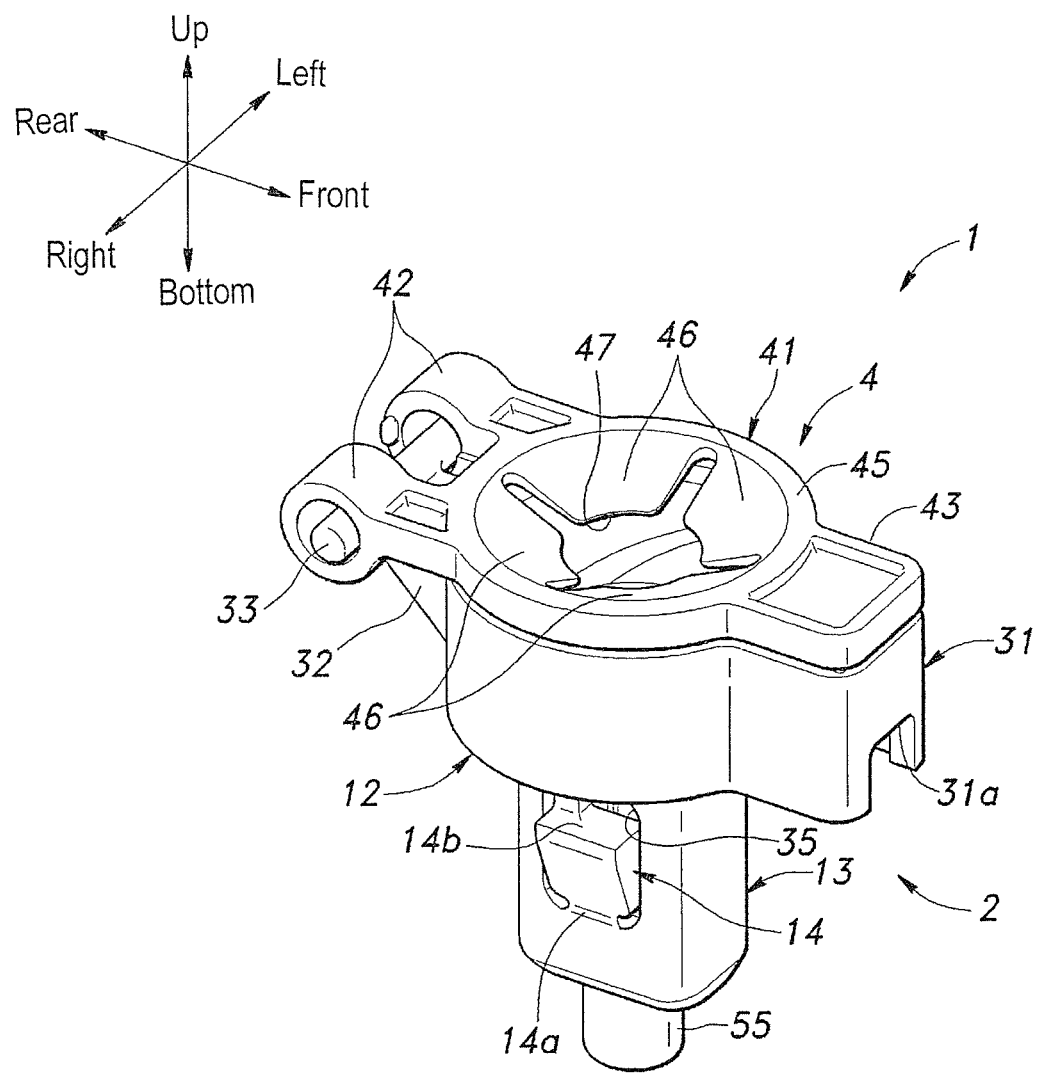
FIG. 2 is a perspective view showing a temporarily connected state between a clip main body and a pin in the clip shown in FIG. 1.
Figure 3:
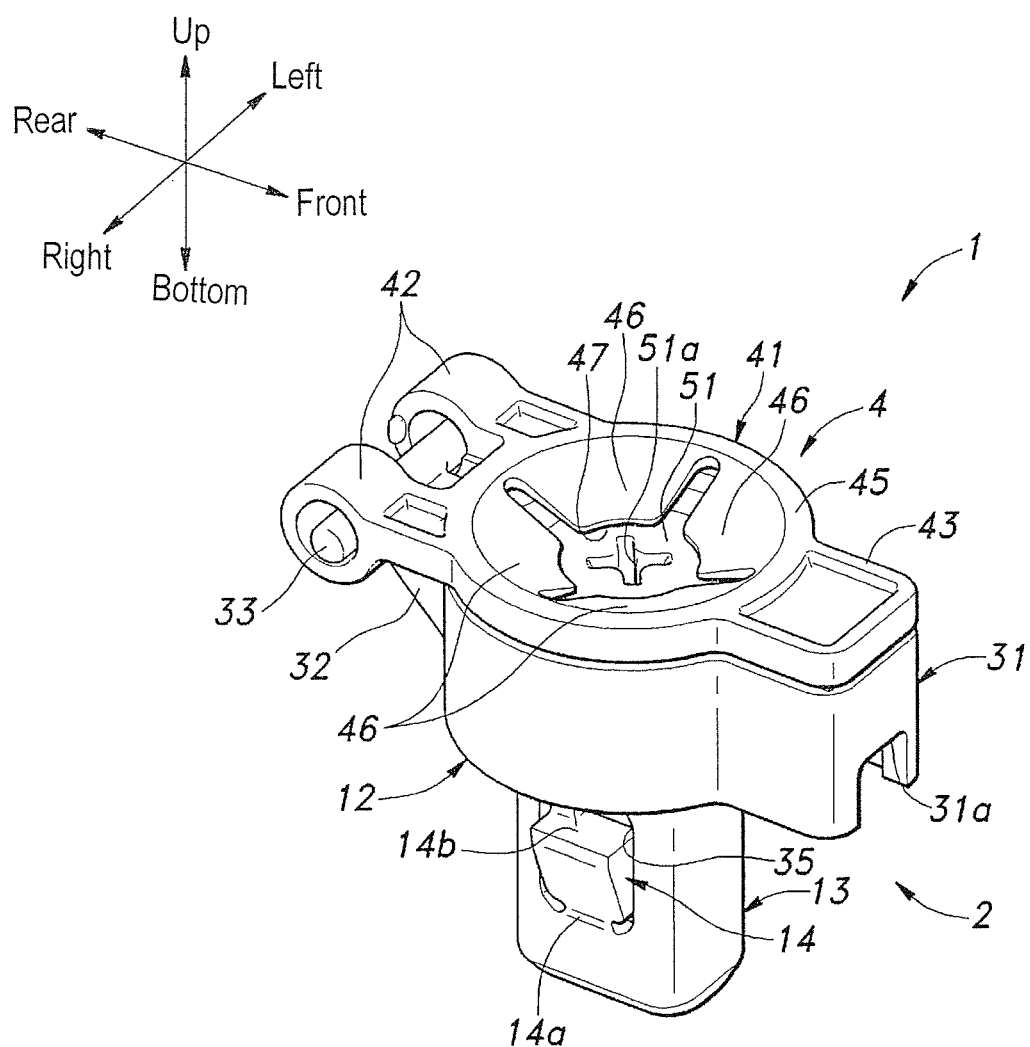
FIG. 3 is a perspective view showing a connected state between the clip main body and the pin in the clip shown in FIG. 1.

As shown in FIG. 2 or FIG. 3, the lid body 4 includes an approximately circular lid center portion 41 having the same outer diameter as that of the main body head portion 12; a right-and-left pair of bearing portions 42 forming a cylindrical shape and connected to a back side of the lid center portion 41; and an approximately rectangular projecting piece 43 projected on a front side of the lid center portion 41.

The lid center portion 41 includes an annular frame body 45, and a plurality (here, four pieces) of leaf spring portions 46 made of resin and projecting inward and obliquely downward from an inner peripheral edge of the frame body 45 in a closed state of the lid body 4. The leaf spring portions 46 have an approximately fan shape whose central angle side thereof is notched in an arc shape, and are respectively disposed equally at a predetermined interval in a circumferential direction. In the leaf spring portions 46, as a base end of an outer edge portion connected to the frame body 45, a spring action can be generated by a bending deformation on the free end side. At a center of the lid center portion 41, there is defined an approximately circular operation opening 47 into which the later-described torque driver D (see FIG. 6) is inserted by an arc-shaped center-side end edge of each leaf spring portion 46.

In the right and left bearing portions 42, there are respectively loosely fitted right and left ends of the support shaft 33 in the clip main body 2, and thereby, the lid body 4 can turn around the support shaft 33 from an open position (see FIG. 1) up to a closed position shown in FIG. 2 or FIG. 3. As shown in FIG. 1, on a lower face of the projecting piece 43, there is provided a connection claw 48 for connecting to the clip main body 2. The connection claw 48 is engaged in an upper edge of the notch portion 31a of the locking portion 31 in the clip main body 2 from an inner side in the closed position shown in FIG. 2, and thereby, the closed state of the lid body 4 is stably held.

As shown in FIG. 1, the pin 3 includes the pin head portion 51 forming a circular flange shape; and a pin shaft portion 52 forming an approximately column shape and extending downward from the pin head portion 51. On an upper face of the pin head portion 51, there is formed, for example, a cross groove 51a (a tool engaging portion) engaging the later-described torque driver D. Also, on a lateral face of the pin head portion 51, there is provided a pair of guide portions 53 guiding a rotation movement around an axis of the later-described pin 3. The pair of guide portions 53 forms a column shape coaxially disposed, and projects in a mutually opposing direction. In the pin shaft portion 52, a diameter of an intermediate portion in an up-and-down direction is reduced, and thereby, there are formed a large diameter portion 55 positioned on a tip side (a lower end side); and a small diameter portion 56 positioned on a side of the pin head portion 51 more than the large diameter portion 55, and having an outer diameter smaller than that of the large diameter portion 55. Between the large diameter portion 55 and the small diameter portion 56, there is formed an inclined surface 57 forming an approximately conical surface shape.

Incidentally, arrangements and sizes (the outer diameters) of the large diameter portion 55 and the small diameter portion 56 (including the inclined surface 57) can be variously modified provided that an inward deformation of the later-described elastic engaging piece 14 (the engaging claw 14b) can be allowed or controlled selectively based on an advance-and-retract movement of the pin 3.

Next, using the clip 1 having the aforementioned structure, a direction of mutually fixing both members will be explained. Here, in the first and second members P1 and P2 which become fixation objects, there are respectively formed attachment holes P1a and P2a having approximately the same size as the leg portion 13 (a horizontal cross-sectional face) such that the leg portion 13 of the clip 1 can be inserted.

When the clip 1 is used, as shown in FIG. 2, a user closes the lid body 4 in a state wherein the pin 3 is inserted into the clip main body 2, so that the clip main body 2 and the pin 3 come to a temporarily connected state. When the pin 3 is inserted into the clip main body 2, the pair of guide portions of the pin 3 comes to a state of respectively slidingly contacting with the pair of inclined surfaces 21 of the main body head portion 12, and thereby, the pin 3 is guided by the inclined surface 21 so as to be inserted into the through-hole while rotating in a predetermined direction (a counterclockwise direction in FIG. 4). Eventually, the pin 3 is pushed in up to an advanced position (a first position) shown in FIG. 4 and FIG. 6.

At that time, the pair of guide portions 53 of the pin 3 climbs over the convex portion 24 respectively to a downward side, and is housed in the concave portion 23 (see FIG. 5) through a gap between the convex portion 24 and the projecting piece 25. In that case, a movement of the pin 3 to a retracted position side on the inclined surface 21 is controlled by the convex portion 24, so that the pin 3 is stably held in the advanced position. Also, even in a case wherein an external force acts in an anti-insertion direction thereof relative to the pin 3 in the advanced position, an upward movement of the pin 3 is controlled by the projecting piece 25, so that the pin 3 is stably held in the advanced position.

Figure 6:
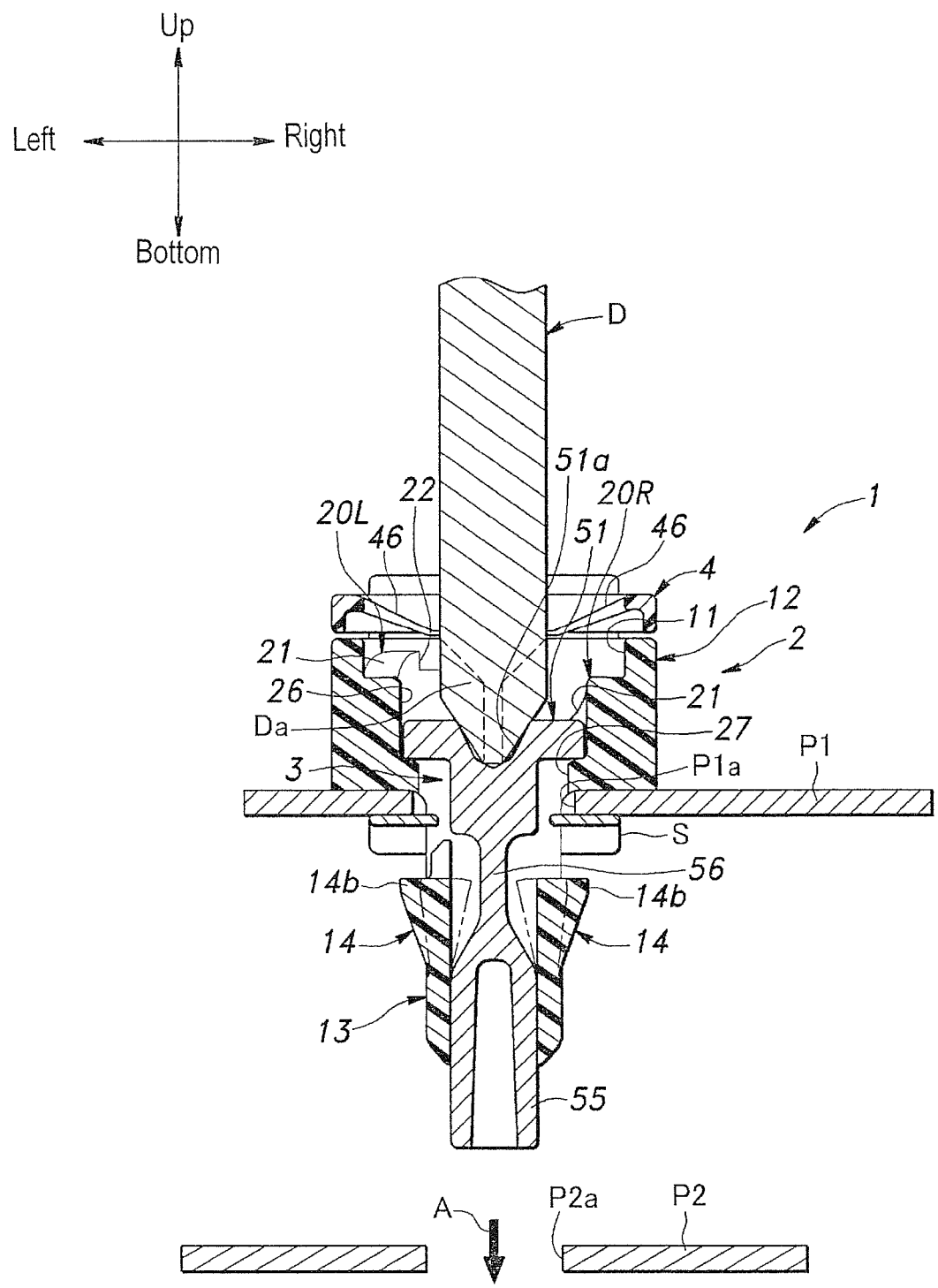
FIG. 6 is a cross-sectional view showing a temporary fixing state (the temporarily connected state between the clip main body and the pin) of the clip relative to a first member.

Also, at that time, as shown in FIG. 6, a tip portion (one portion of the large diameter portion 55) of the pin 3 comes to a state of projecting from a tip of the leg portion 13, and the small diameter portion 56 (including the inclined surface 57) of the pin shaft portion 52 moves up to a position facing an inner side of the engaging claw 14b of the elastic engaging piece 14. Thereby, a gap is formed between an outer peripheral face of the small diameter portion 56 and a face of the inner side of the engaging claw 14b so as to come to a state of allowing an inward elastic deformation of the elastic engaging piece 14 (i.e., an inward displacement of the engaging claw 14b) as shown in FIG. 6 by two-dot chain lines. Incidentally, a lower face of a peripheral edge portion of the pin head portion 51 abuts against an upper face of the second step portion 27 formed below the through-hole 11 so as to control a further downward movement of the pin 3 which is located in the advanced position.

Next, as shown in FIG. 6, a user inserts the leg portion 13 of the clip 1 shown in FIG. 2 into the attachment hole P1a of the first member P1, and furthermore attaches a spacer S to a lower side of the first member P1 in the leg portion 13. At that time, an end face on an upper side of the attachment hole P1a comes to a state of abutting against a lower face of the main body head portion 12 which is larger than the leg portion 13, so that the first member P1 is fixed by the main body head portion 12. Then, a user fits a tip portion (a cross-shaped portion) Da of the torque driver D into the groove 51a of the pin head portion 51 to be engaged, so that the clip 1 comes to a temporary fixing state relative to the first member P1.

Incidentally, a shape or a size of the spacer S can be modified according to a thickness and the like of the members which become the fixation objects, and depending on the situation, the spacer S can be omitted. Also, regarding a shape of the tip portion of the tool (the torque driver D), and a shape of the tool engaging portion of the pin head portion 51, the shape of the tip portion of the tool (the torque driver D), and the shape of the tool engaging portion of the pin head portion 51 are not limited to a cross shape, and can be variously modified as long as a engaging state of both members can be held. Also, the tool engaging portion of the pin head portion 51 may be provided as a convex shape portion, and a concave shape portion fitting in the convex shape portion thereof may be provided at the tip portion of the tool.

Next, a user grips a grip portion (not shown in the figures) of the torque driver D, and inserts the leg portion 13 of the clip 1 into the attachment hole P2a of the second member P2 in a direction shown by an arrow A in FIG. 6. Here, a right-and-left width of the attachment hole P2a is set in a size which is approximately the same as a right-and-left width of the leg portion 13, so that the leg portion 13 is inserted into the attachment hole P2a while elastically deforming (see the two-dot chain lines) the elastic engaging piece 14 inward. Thereby, as shown in FIG. 7, there comes to a temporarily fixed state wherein an end face of a lower side of the attachment hole P2a in the second member P2 is engaged by the engaging claw 14b of the elastic engaging piece 14.

Figure 7:
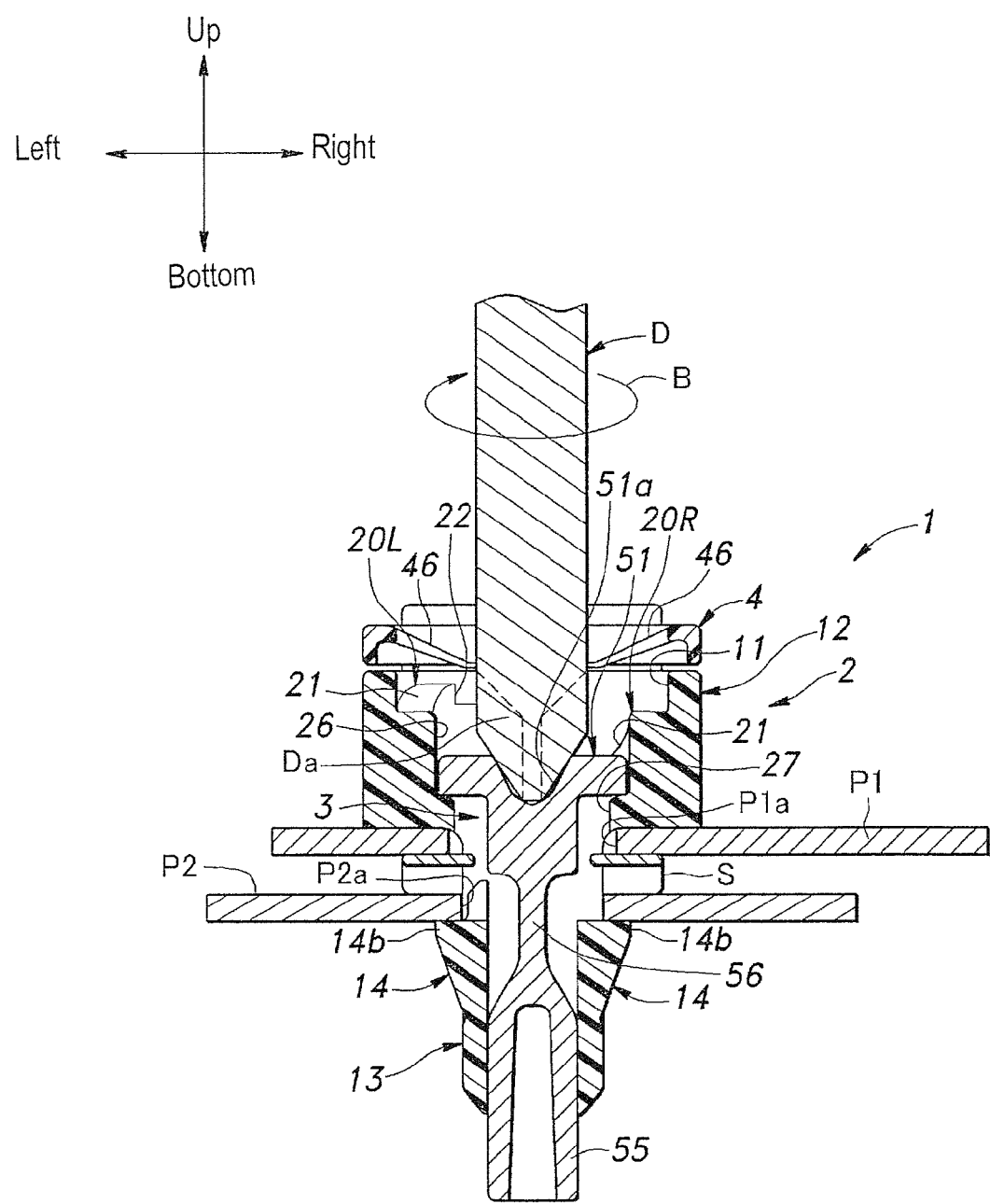
FIG. 7 is a cross-sectional view showing a temporarily fixed state (the temporarily connected state between the clip main body and the pin) of the clip relative to the first member and a second member.

Thereafter, a user rotates the torque driver D in a direction shown by an arrow B in FIG. 7 (i.e., a clockwise direction in FIG. 4) so as to move the pin 3 upward (the anti-insertion direction). At that time, the pair of guide portions 53 in the pin 3 slidingly moves in such a way as to climb up the pair of inclined surfaces 21 of the main body head portion 12, and thereby, the pin 3 moves upward while rotating by being guided by the inclined surface 21. Eventually, the pin 3 rises to a retracted position (a second position) shown in FIG. 3 and FIG. 8.

There, on the upper face of the pin head portion 51 reached up to a vicinity of the retracted position, an edge portion on a center side of the leaf spring portion 46 obliquely downwardly inclined abuts, and thereby, an urging force of the leaf spring portion 46 acts in a direction of pressing the pin 3 downward (an advanced position side). Therefore, a user rotates the pin 3 against the urging force of the leaf spring portion 46, and eventually moves the pin 3 up to the retracted position.

When the pin 3 reaches the retracted position, the pair of guide portions 53 of the pin 3 is housed in the concave portion 22 on the upper end side of the inclined surface 21. Thereby, the pin 3 is stably held in the retracted position. Moreover, at that time, in the pin head portion 51, the urging force continuously acts by the leaf spring portion 46 downward (an insertion direction of the guide portion 53 into the concave portion 22). Thereby, the guide portion 53 is prevented from coming out of the concave portion 22, and the pin 3 is reliably held in the retracted position.

Figure 8:
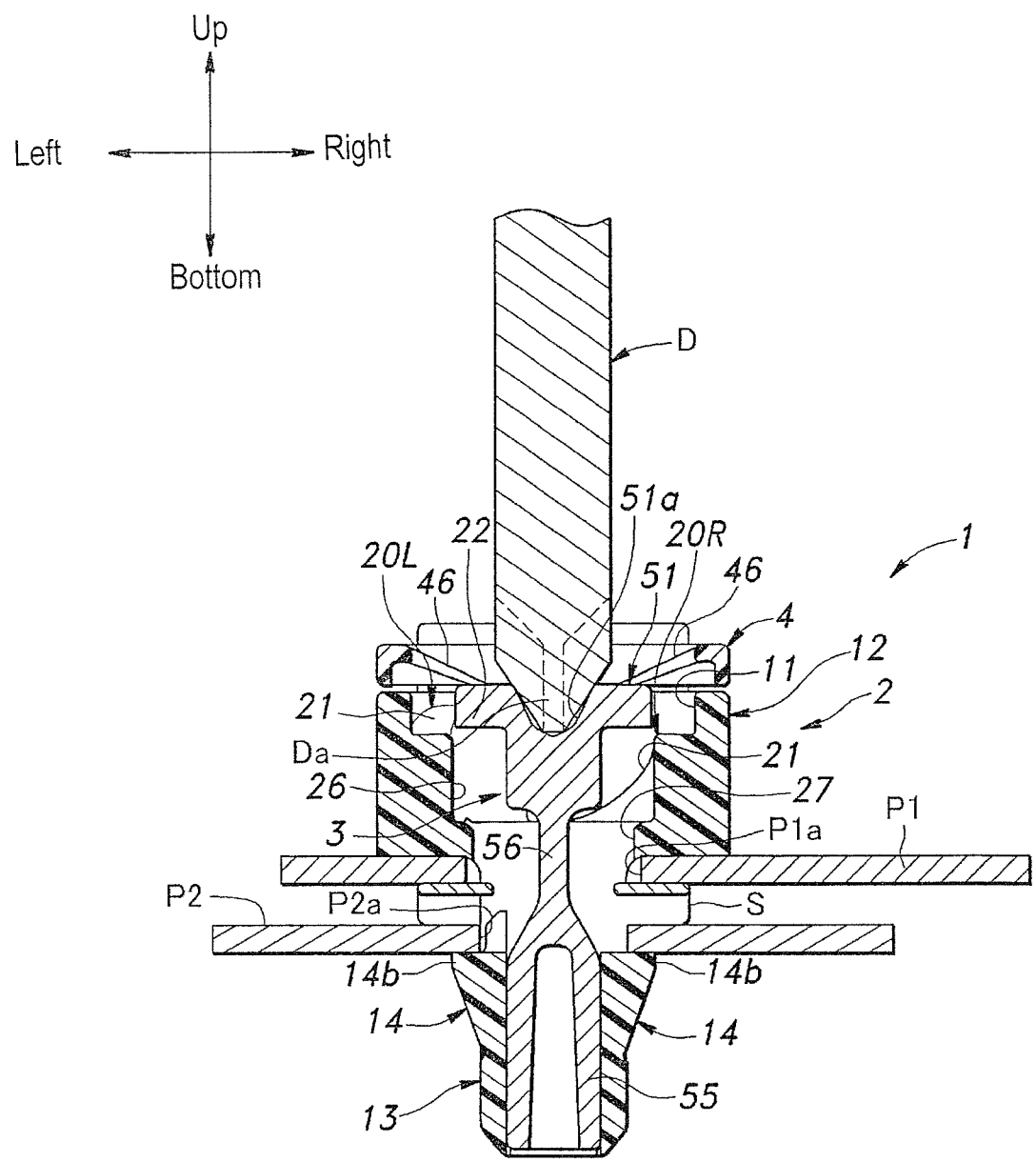
FIG. 8 is a cross-sectional view showing a fix-completion state (the connected state between the clip main body and the pin) of the clip relative to the first member and the second member.

Also, at that time, as shown in FIG. 8, the tip portion (one portion of the large diameter portion 55) of the pin 3 comes to a state of being entered inside the leg portion 13, and the large diameter portion 55 of the pin shaft portion 52 moves up to the position facing the inner side of the engaging claw 14*b* of the elastic engaging piece 14. Thereby, an outer peripheral face of the large diameter portion 55 abuts against or approaches the face of the inner side of the engaging claw 14*b* so as to come to a state of controlling the inward elastic deformation of the elastic engaging piece 14 (i.e., the inward displacement of the engaging claw 14*b*). Thus, the first and second members P1 and P2 overlaid through the spacer S come to a fix-completion state of being firmly clamped between the main body head portion 12 and the engaging claw 14*b* of the elastic engaging piece 14.

Incidentally, a user extracts the guide portion 53 from the concave portion 22 in an open state of the lid body 4, and moves the pin 3 to the advanced position side again so as to release the fix-completion state shown in FIG. 8. Thereby, the clip 1 comes to the temporarily fixed state shown in FIG. 7, and eventually, releases a connection between the clip main body 2 and the pin 3 so as to be reused.

Thus, according to the clip 1 of the present invention, a user can easily move the pin by a guide of the inclined surface, and mutually fix or fix-release the first and second members P1 and P2. Also, a user can easily confirm a fixed or fix-released state of both members by a position of the pin. Incidentally, a positional relationship between the elastic engaging piece 14 (the engaging claw 14*b*), the large diameter portion 55, and the small diameter portion 56 of the pin 3 carrying out the advance-and-retract movement is not limited to the aforementioned embodiments, and can be variously modified. For example, an arrangement between the large diameter portion 55 and the small diameter portion 56 shown in the embodiments may be reversed so as to have a structure such that while allowing the inward deformation of the elastic engaging piece in the retracted position, the deformation thereof is controlled in the advanced position.

Especially, the pin moves from the advanced position to the retracted position, so that the first and second members P1 and P2 are fixed. Accordingly, a user can temporarily fix the members P1 and P2 by a simple operation of retracting the pin 3 up to the retracted position while rotating the torque driver D after attaching the torque driver D to the pin head portion 51 in a state wherein the pin 3 is temporarily connected relative to the clip main body 2 in the advanced position, and inserting the leg portion 13 into the attachment holes of both members P1 and P2 so as to come to the temporarily fixed state. In that case, as shown in FIG. 6, the torque driver D is attached relative to the pin 3 which is located in the advanced position (i.e., deeply inserted into the clip main body 2) so as to suppress inconveniences such as a wobble and the like of the pin 3 which is temporarily connected to the clip main body 2 as well. Also, regardless of the advanced position and the retracted position of the pin 3, the pin head portion 51 comes to a state of being housed inside the main body head portion 12 closed by the lid body 4, so that an external force does not act on the pin head portion 51 in a direction of extracting the pin 3 as well.

Also, in the clip 1, a rotation range of the pin 3 can be appropriately restricted by the partition wall 28 provided on the upper end side (the side opposing the inclined surface 21) of the concave portion 22 in the main body head portion 12 so as to reliably carry out the rotation movement of the pin 3 between the advanced position and the retracted position. Moreover, in the pin 3, there is projected the guide portion 53 in the mutually opposing direction in such a way as to be orthogonal to an axial direction thereof, and on the other hand, in the clip main body 2, the pair of inclined surfaces 21 guiding the guide portion 53 is formed as a symmetrical shape divided by the partition wall 28, so that by a simple structure, the rotation range of the pin 3 is appropriately restricted, and the rotation movement of the pin 3 can be stably carried out between the advanced position and the retracted position.

Also, in the aforementioned fixing work, in a case wherein a user completes the rotational operation of the pin 3 in a state wherein the guide portion 53 is not completely housed in the concave portion 22, the pin 3 returns to the advanced position side again by the urging force of the leaf spring portion 46. Therefore, a user visually confirms whether the pin head portion 51 is located in a state of being exposed from an upper portion of the main body head portion 12 (see FIG. 3), or the pin head portion 51 is located in a state of being entered (see FIG. 2) so as to reliably identify the temporarily fixed state (the fix-released state) and the fix-completion state of the clip 1. Especially, in the fix-completion state, the pin 3 moves to the retracted position (i.e., a user side), so that a user has the advantage of easily recognizing a completion of fixation.

Also, when the clip 1 is switched from the temporarily fixed state (see FIG. 7) to the fix-completion state (see FIG. 8) in the aforementioned manner, a fastening torque value and the number of fastening times of the torque driver D are managed so as to manage and ensure whether or not the fixing work by a user is adequately carried out.

The clip 1 having such structure is suitable for an automobile interior, and for example, the clip 1 can be used when an interior equipment such as a curtain airbag and the like as the first member P1 is attached to a body panel as the second member P2.

The present invention has been explained based on specific embodiments; however, those embodiments are simply shown as an example, and the present invention is not limited to those embodiments. For example, the fixation object of the clip according to the present invention is not limited to the plate-like member provided that the fixation object of the clip includes a fixation portion (a portion where the attachment hole is formed) which can be clamped at least by the clip main body. Also, the tool for rotating the pin is not limited to the torque driver, and another known tool may be used. Also, shapes, arrangements, and quantities of the guide portion provided in the pin, and the inclined surface of the clip main body guiding the guide portion can be appropriately modified provided that they provide the same function as the aforementioned embodiments. Incidentally, each of structure members of the clip according to the present invention shown in the aforementioned embodiments is not necessarily essential entirely, and at lease can be selected appropriately within a range of the subject of the present invention.

EXPLANATION OF SYMBOLS

1 . . . a clip, 2 . . . a clip main body, 3 . . . a pin, 4 . . . a lid body, 11 . . . a through-hole, 12 . . . a main body head portion, 13 . . . a leg portion, 14 . . . an elastic engaging piece, 20L and 20R . . . step portions, 21 . . . an inclined surface, 22 . . . a concave portion (a rotation-control concave portion), 23 . . . an opening portion, 24 . . . a convex portion (a rotation-control convex portion), 25 . . . a projecting piece (an escape-control projecting portion), 28 . . . a partition wall (a rotation control wall), 46 . . . a leaf spring portion (an urging piece), 51 . . . a pin head portion, 51*a* . . . a groove (a tool engaging portion), 52 . . . a pin shaft portion, 53 . . . a guide portion, 55 . . . a large diameter portion, 56 . . . a small diameter portion, D . . . a torque driver (a tool), P1 . . . a first member, P1*a* . . . an attachment hole, P2 . . . a second member, P2*a* . . . an attachment hole

What is claimed is:

1. A clip, comprising:
   a clip main body for mutually fixing first and second members; and
   a pin inserted into the clip main body rotatably and to advance and retract,
   wherein the clip main body includes:
      a main body head portion having a through-hole into which the pin is inserted;
      a leg portion extending from the main body head portion, and adapted to be inserted into attachment holes of the first and second members; and
      an elastic engaging piece provided to be elastically deformable in a direction of intersecting in an insertion direction of the pin, and projecting outward from the leg portion adapted to lock the attachment hole of the second member,
   the pin includes:
      a pin head portion provided with a tool-engaging portion adapted to engage a tool carrying out a rotational operation thereof; and
      a pin shaft portion having a small diameter portion and a large diameter portion,
   the main body head portion includes an inclined surface, extending along an inner peripheral edge portion of the through-hole, and inclined from one end side toward another end side in an axial direction of the through-hole,
   the pin includes a guide portion slidingly contacting with the inclined surface, wherein when the pin rotates inside the clip main body in a condition where the guide portion slidingly contacts with the inclined surface, the pin advances and retracts between a first position allowing an inward elastic deformation thereof by facing the small diameter portion with the elastic engaging piece, and a second position controlling the inward elastic deformation thereof by facing the large diameter portion with the elastic engaging piece, and
   the main body head portion includes a rotation-control concave portion disposed on one end side of the inclined surface, into which the guide portion is inserted when the pin is located in the second position.

2. A clip according to claim 1, wherein the pin moves from an advanced position which is the first position to a retracted position which is the second position, so that the first and second members come to a mutually fixed state.

3. A clip comprising
   a clip main body for mutually fixing first and second members;
   a pin inserted into the clip main body rotatably and to advance and retract, and
   a lid body attached to an insertion side of the pin in the clip main body,
   wherein the clip main body includes:
      a main body head portion having a through-hole into which the pin is inserted;
      a leg portion extending from the main body head portion, and adapted to be inserted into attachment holes of the first and second members; and
   an elastic engaging piece provided to be elastically deformable in a direction of intersecting in an insertion direction of the pin, and projecting outward from the leg portion adapted to lock the attachment hole of the second member,
   the pin includes:
      a pin head portion provided with a tool-engaging portion adapted to engage a tool carrying out a rotational operation thereof; and
      a pin shaft portion having a small diameter portion and a large diameter portion,
   the main body head portion includes an inclined surface, extending along an inner peripheral edge portion of the through-hole, and inclined from one end side toward another end side in an axial direction of the through-hole,
   the pin includes a guide portion slidingly contacting with the inclined surface, wherein when the pin rotates inside the clip main body in a condition where the guide portion slidingly contacts with the inclined surface, the pin advances and retracts between a first position allowing an inward elastic deformation thereof by facing the small diameter portion with the elastic engaging piece, and a second position controlling the inward elastic deformation thereof by facing the large diameter portion with the elastic engaging piece, and
   the lid body includes an urging piece urging the pin in an insertion direction of the guide portion relative to a rotation-control concave portion when the pin is located in the second position.

4. A clip according to claim 3, wherein the rotation-control concave portion is disposed on one end side of the inclined surface.

5. A clip comprising:
   a clip main body for mutually fixing first and second members; and
   a pin inserted into the clip main body rotatably and to advance and retract,
   wherein the clip main body includes:
      a main body head portion having a through-hole into which the pin is inserted;
      a leg portion extending from the main body head portion, and adapted to be inserted into attachment holes of the first and second members; and
      an elastic engaging piece provided to be elastically deformable in a direction of intersecting in an insertion direction of the pin, and projecting outward from the leg portion adapted to lock the attachment hole of the second member,
   the pin includes:
      a pin head portion provided with a tool-engaging portion adapted to engage a tool carrying out a rotational operation thereof; and
      a pin shaft portion having a small diameter portion and a large diameter portion,
   the main body head portion includes an inclined surface, extending along an inner peripheral edge portion of the through-hole, and inclined from one end side toward another end side in an axial direction of the through-hole,
   the pin includes a guide portion slidingly contacting with the inclined surface, wherein when the pin rotates inside the clip main body in a condition where the guide portion slidingly contacts with the inclined surface, the pin advances and retracts between a first position allowing an inward elastic deformation thereof by facing the small diameter portion with the elastic engaging piece, and a second position controlling the inward elastic deformation thereof by facing the large diameter portion with the elastic engaging piece, and
   the main body head portion includes a rotation-control convex portion positioned on one end side of the inclined surface, and abutting against the pin which is located in the first position to control a rotation of the pin into a second position side.

6. A clip comprising:

a clip main body for mutually fixing first and second members; and a pin inserted into the clip main body rotatably and to advance and retract, wherein the clip main body includes:

a main body head portion having a through-hole into which the pin is inserted;

a leg portion extending from the main body head portion, and adapted to be inserted into attachment holes of the first and second members; and an elastic engaging piece provided to be elastically deformable in a direction of intersecting in an insertion direction of the pin, and projecting outward from the leg portion adapted to lock the attachment hole of the second member, the pin includes:

a pin head portion provided with a tool-engaging portion adapted to engage a tool carrying out a rotational operation thereof; and a pin shaft portion having a small diameter portion and a large diameter portion, the main body head portion includes an inclined surface, extending along an inner peripheral edge portion of the through-hole, and inclined from one end side toward another end side in an axial direction of the through-hole, the pin includes a guide portion slidingly contacting with the inclined surface, wherein when the pin rotates inside the clip main body in a condition where the guide portion slidingly contacts with the inclined surface, the pin advances and retracts between a first position allowing an inward elastic deformation thereof by facing the small diameter portion with the elastic engaging piece, and a second position controlling the inward elastic deformation thereof by facing the large diameter portion with the elastic engaging piece, and the main body head portion includes a rotation control wall projecting inward from an inner peripheral face of the through-hole at least at one end portion of the inclined surface, and controlling a movement of the guide portion.

7. A clip according to claim 6, wherein the rotation control wall abuts against the guide portion respectively in the first position and the second position of the pin, and controls a further movement of the pin which is located in the second position and a further movement of the pin which is located in the first position.

8. A clip according to claim 7, wherein the main body head portion includes an escape-control projecting portion positioned on one end side of the inclined surface, and projecting inward from the inner peripheral face of the through-hole in such a way as to abut against the pin which is located in the first position from an anti-insertion side thereof.

* * * * *